(12) United States Patent
Moro et al.

(10) Patent No.: US 10,232,959 B2
(45) Date of Patent: Mar. 19, 2019

(54) METHOD AND SYSTEM FOR CONTROLLING THE ORBIT OF A SATELLITE IN EARTH ORBIT

(71) Applicant: AIRBUS DEFENCE AND SPACE SAS, Les Mureaux (FR)

(72) Inventors: Valerio Moro, Toulouse (FR); Jean Fischer, Toulouse (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 0 days.

(21) Appl. No.: 15/318,670

(22) PCT Filed: Jun. 19, 2015

(86) PCT No.: PCT/EP2015/063879
§ 371 (c)(1),
(2) Date: Dec. 13, 2016

(87) PCT Pub. No.: WO2015/193499
PCT Pub. Date: Dec. 23, 2015

(65) Prior Publication Data
US 2017/0129627 A1    May 11, 2017

(30) Foreign Application Priority Data

Jun. 19, 2014  (FR) ..................... 14 55630

(51) Int. Cl.
*B64G 1/24*  (2006.01)
*B64G 1/26*  (2006.01)
(Continued)

(52) U.S. Cl.
CPC ............... *B64G 1/242* (2013.01); *B64G 1/26* (2013.01); *B64G 1/283* (2013.01); *B64G 1/286* (2013.01); *F02K 9/84* (2013.01)

(58) Field of Classification Search
CPC ......... B64G 1/242; B64G 1/26; G05D 1/0883
See application file for complete search history.

(56) References Cited

U.S. PATENT DOCUMENTS 5,506,780 A * 4/1996 Montenbruck ...... B64G 1/1085
  244/158.8
5,984,236 A * 11/1999 Keitel ...................... B64G 1/24
  244/164
(Continued)

FOREIGN PATENT DOCUMENTS

EP    0 780 299 A1    6/1997
EP    1 024 082 A2    8/2000
(Continued)

*Primary Examiner* — Joseph W Sanderson
(74) *Attorney, Agent, or Firm* — Im IP Law; C. Andrew Im; Chai Im

(57) ABSTRACT

A method for controlling the orbit of a satellite in earth orbit. The orbit of the satellite is controlled by commanding, according to a maneuver plan, a propulsion system having at least one thruster and a transporter to move the propulsion system. The maneuver plan includes at least two orbit-control maneuvers. The thrust powers of the propulsion system during the two orbit control maneuvers have respective thrust directions that are not parallel in an inertial frame of reference. Each thrust power is determined to simultaneously control the inclination and the position of the orbit of the satellite as well as to form a momentum that is suitable for unloading a device for storing angular momentum of the satellite in a plane orthogonal to the direction of thrust of the thrust power.

25 Claims, 5 Drawing Sheets

(51) Int. Cl.
 *B64G 1/28* (2006.01)
 *F02K 9/84* (2006.01)

(56) References Cited

U.S. PATENT DOCUMENTS

| | | | | |
|---|---|---|---|---|
| 6,032,904 | A * | 3/2000 | Hosick | B64G 1/26 244/169 |
| 6,042,058 | A * | 3/2000 | Anzel | B64G 1/24 244/164 |
| 6,135,394 | A * | 10/2000 | Kamel | B64G 1/242 244/158.8 |
| 6,296,207 | B1 * | 10/2001 | Tilley | B64G 1/242 244/165 |
| 6,314,344 | B1 * | 11/2001 | Sauer | B64G 1/24 244/158.8 |
| 6,439,507 | B1 * | 8/2002 | Reckdahl | B64G 1/242 244/158.8 |
| 6,565,043 | B1 | 5/2003 | Wittmann | |
| 6,921,049 | B2 * | 7/2005 | Fowell | B64G 1/26 244/164 |
| 8,282,043 | B2 * | 10/2012 | Ho | B64G 1/26 244/158.8 |
| 8,346,410 | B2 * | 1/2013 | Seo | B64G 1/26 244/158.1 |
| 9,527,607 | B2 * | 12/2016 | Celerier | B64G 1/405 |
| 9,573,703 | B2 * | 2/2017 | Celerier | F02K 9/84 |
| 2013/0292516 | A1 | 11/2013 | Celerier | |
| 2013/0313369 | A1 | 11/2013 | Celerier | |
| 2014/0361124 | A1 * | 12/2014 | Celerier | B64G 1/242 244/158.6 |
| 2016/0167810 | A1 * | 6/2016 | Janu | B64G 1/24 244/171.2 |
| 2018/0029727 | A1 * | 2/2018 | Doubrere | B64G 1/40 |

FOREIGN PATENT DOCUMENTS

| | | |
|---|---|---|
| EP | 2 660 154 A2 | 11/2013 |
| EP | 2 666 723 A1 | 11/2013 |

* cited by examiner

METHOD AND SYSTEM FOR CONTROLLING THE ORBIT OF A SATELLITE IN EARTH ORBIT

RELATED APPLICATIONS

This application is a § 371 application from PCT/EP2015/063879 filed Jun. 19, 2015, which claims priority from French Patent Application No. 14 55630 filed Jun. 19, 2014, each of which is incorporated herein by reference in its entirety.

TECHNICAL FIELD

The present invention belongs to the field of orbit and attitude control of satellites. The invention finds a particularly advantageous but non-limiting application in the case of telecommunications satellites in geostationary orbit (GEO) equipped with electrical propulsion means.

BACKGROUND OF THE INVENTION

It is known that a satellite in Earth orbit is subjected to numerous disturbances. The disturbances tend on the one hand to move the satellite relative to a set point position in its orbit and on the other hand to modify the attitude of said satellite relative to a set point attitude.

In order to maintain the satellite substantially in the set point position and in the set point attitude, it is necessary to perform orbit control and attitude control of said satellite.

Orbit control consists in limiting the variations of the orbital parameters generally expressed in terms of inclination, longitude and eccentricity of the orbit of the satellite. In the case of a satellite in GEO orbit, such as a telecommunications satellite, orbit control amounts to controlling the position of the satellite relative to the Earth and is also known as stationkeeping (S/K).

Orbit control of a satellite in GEO orbit generally employs a number of orbit control maneuvers during which thrusters of the satellite are activated. Orbit control of the satellite is performed by adjusting the thrust forces produced by said thrusters during the various orbit control maneuvers, and also by adjusting the durations of activation of said thrusters. In the conventional way, a number of orbit control maneuvers are performed:

North/South (N/S) maneuvers making it possible to control the inclination of the orbit of the satellite, East-West (E/W) maneuvers making it possible to control the longitude of the orbit of the satellite.

Eccentricity is generally controlled during E/W maneuvers in the case of chemical thrusters or during N/S maneuvers in the case of electrical thrusters.

A satellite frame of reference may be defined centered on the center of mass of said satellite and including three axes X, Y and Z: the axis X is parallel to a speed vector of the satellite, the axis Z is directed toward the Earth and the axis Y is orthogonal to the axes X and Z. In the satellite frame of reference, N/S maneuvers necessitate thrust forces along the axis Y while E/W maneuvers necessitate thrust forces along the axis X of the satellite frame of reference.

In the general situation, N/S and E/W maneuvers employ separate thrusters, possibly using different technologies (for example electrical for N/S maneuvers and chemical for E/W maneuvers). The thrusters used for N/S maneuvers may be mounted on movement means. Such movement means are employed to maintain the thrust directions of the thrusters aligned in the plane YZ with the center of mass of the satellite (which can vary in time as a function of the quantity of propellants in the tanks, the position/orientation of the equipment of the payload, etc.), in order to avoid producing torques liable to modify the attitude of the satellite.

The times of the orbit control maneuvers (i.e. the times of activation of the thrusters), the durations of said orbit control maneuvers (i.e. the durations of activation of the thrusters), and the thrust forces of said orbit control maneuvers constitute an orbit control maneuver plan. This maneuver plan is determined so as to minimize the consumption of the thrusters whilst maintaining the orbital parameters within predefined ranges.

Attitude control consists in controlling the orientation of the satellite, in particular relative to the Earth. When the satellite is on station in orbit, the disturbances apply torques that tend to cause said satellite to turn about its center of mass and therefore to modify the attitude of said satellite relative to the set point attitude. It is noted that the orbit control maneuvers can also apply disturbing torques if the thrust forces are not perfectly aligned with the center of mass of the satellite.

In order to maintain the satellite in the set point attitude, it is generally equipped with an angular momentum storage device. The angular momentum storage device includes for example at least three reaction wheels with rotation axes that are linearly independent. By controlling the rotation speed of said reaction wheels it is possible to create torques that oppose the disturbing torques.

Because of the cumulative effect of the disturbing torques, the rotation speeds of said reaction wheels, and therefore the stored angular momentum, tend to increase progressively. It is consequently necessary to desaturate the angular momentum storage device regularly in order to limit the speed excursion of said reaction wheels. By "desaturate" is meant applying external moments to the satellite which, when they are taken up by the angular momentum storage device, make it possible to reduce the quantity of angular momentum stored. This kind of unloading of the angular momentum storage device is known as angular momentum unloading.

Angular momentum unloading generally employs dedicated thrusters that are activated during dedicated attitude control maneuvers.

It is therefore clear that orbit control and attitude control, in particular angular momentum unloading of a satellite employ numerous different thrusters and/or numerous different maneuvers. Because it includes numerous different thrusters, the complexity and the manufacturing cost of the satellite are increased. Because numerous different maneuvers must be performed, the consumption of the thrusters is increased, which can reduce the service life of the satellite, especially in the case of chemical thrusters. Also, increasing the number of ON/OFF sequences of the thrusters has a negative effect on their service life. Moreover, the operational load of the ground segment is directly linked to the number of maneuvers. It is therefore desirable to limit their number.

SUMMARY OF THE INVENTION

The objective of the present invention is to remedy some or all of the limitations of the prior art solutions, notably those described above, by proposing a solution that makes it possible to limit both the number of thrusters and the number of maneuvers necessary to control the orbit of the satellite and to perform angular momentum unloading of the satellite.

To this end, and in accordance with a first aspect, the invention concerns a method for controlling the orbit of a satellite in Earth orbit, in which the orbit of the satellite is controlled by commanding, according to a maneuver plan, propulsion means including at least one thruster, and means for moving said propulsion means in a satellite frame of reference centered on a center of mass of the satellite and including three axes X, Y and Z, the axis X being parallel to a speed vector of the satellite, the axis Z being directed toward the Earth, and the axis Y being orthogonal to the axes X and Z. The movement means are moreover adapted:

- to modify angles between a thrust direction of each thruster and the axes respectively X, Y of the satellite frame of reference,
- to move each thruster while maintaining a constant thrust direction in the satellite frame of reference so as to produce a torque about any axis in a plane orthogonal to said thrust direction, the maneuver plan includes at least two orbit control maneuvers, thrust forces of the propulsion means during said two orbit control maneuvers have respective thrust directions that are not parallel in an inertial frame of reference, and said thrust forces of said two orbit control maneuvers are determined so as to control simultaneously the inclination and the longitude of the orbit of the satellite whilst producing torques adapted to desaturate an angular momentum storage device of said satellite in respective planes that are not parallel in the inertial frame of reference, so that said two orbit control maneuvers of the maneuver plan make it possible to desaturate said angular momentum storage device about three axes.

As a general rule, throughout the present application, a thrust force is defined by a thrust vector and a point of application of said thrust force relative to the center of mass of the satellite. The thrust vector is itself defined by a thrust norm and by a unitary norm thrust direction that corresponds to the thrust vector as normalized by said thrust norm.

As indicated above, the movement means make it possible to modify the angles between the thrust direction of each thruster and the axes respectively X, Y of the satellite frame of reference. Consequently, it is possible with movement means of this kind to form a thrust force with a thrust direction appropriate for controlling simultaneously the inclination of the orbit of the satellite (component along the axis Y) and the longitude of the orbit of the satellite (component along the axis X).

The movement means further make it possible to move each thruster with a constant thrust direction in the satellite frame of reference (i.e. only the point of application of the thrust force is moved) so as to produce a torque about any axis in a plane orthogonal to said thrust direction. Consequently, it is possible with movement means of this kind to form a thrust force suitable not only for controlling the inclination and the longitude of the orbit of the satellite but also for producing a torque for unloading the angular momentum storage device in the plane orthogonal to said thrust direction.

In fact, for a given thrust direction, the possible axes of the torque produced on moving the point of application of the thrust force are all located in the plane orthogonal to said thrust direction. Consequently, for a given thrust direction, angular momentum unloading is possible only in a two-dimensional vector space. Because the maneuver plan includes at least two orbit control maneuvers for which the thrust forces are in respective non-parallel directions in the inertial frame of reference, the planes orthogonal to the thrust directions are also not parallel so that, over these two orbit control maneuvers angular momentum unloading is on average possible in a three-dimensional vector space.

In particular embodiments, the satellite orbit control method may have one or more of the following features separately or in any technically possible combination.

In particular embodiments, the maneuver plan is determined so as to provide a predetermined minimum unloading capacity about three axes throughout said two orbit control maneuvers of said maneuver plan.

Features of this kind are advantageous in that they make it possible to facilitate the taking into account of requirements in terms of angular momentum unloading to determine the maneuver plan. For example, it is possible to determine the thrust vectors of the thrust forces of said two orbit control maneuvers so as to control the inclination and the longitude of the orbit of the satellite whilst providing a predetermined minimum angular momentum unloading capacity about three axes throughout said two orbit control maneuvers. After this it is possible to modify the point of application of the thrust forces of said orbit control maneuvers without modifying the thrust vectors determined as a function of requirements in terms of inclination and longitude control to produce the torques for unloading the angular momentum storage device. Because the thrust vectors are determined so as to provide a minimum angular momentum unloading capacity about three axes throughout said two orbit control maneuvers, it is then always possible to perform at least partial angular momentum unloading of the angular momentum storage device whatever the direction in the inertial frame of reference of the angular momentum stored in the latter. Moreover, the minimum angular momentum unloading capacity about three axes may be adjusted over time, for example as a function of the angular momentum to be unloaded during the maneuver plan.

In particular embodiments, the maneuver plan is such that the following condition is verified:

$$|EN1+EN2+RN\cdot\sin(\Delta T)|>\Gamma$$

in which expression:

$\Gamma$ is a strictly positive scalar value,

EN1 corresponds to the ratio between a component along the axis X and a component along the axis Y of the thrust force of a first orbit control maneuver of the maneuver plan, EN2 corresponds to the ratio between a component along the axis X and a component along the axis Y of the thrust force of a second orbit control maneuver of the maneuver plan, RN corresponds to the ratio between a component along the axis Z and the component along the axis Y of the thrust force of the first or second orbit control maneuver of the maneuver plan, $\Delta T$ is equal to $2\pi\cdot(T2-T1-Torb/2)/Torb$, in which expression T1 and T2 are times of the first and second orbit control maneuvers and Torb is the orbital period of the satellite.

Features of this kind are advantageous in that they make it possible to determine a maneuver plan ensuring a minimum three-axis angular momentum unloading capacity of the angular momentum storage device by means of the value $\Gamma$. For example, it is possible to adapt said value $\Gamma$ dynamically as a function of the angular momentum stored in the angular momentum storage device. In fact, if the thrust forces of the at least two orbit control maneuvers of the maneuver plan have almost parallel thrust directions in an inertial frame of reference, then the torque formation capacity in a mean thrust direction of said thrust forces will be low. If it is found that it is not possible to unload effectively the angular momentum storage device, then that will indicate that it is necessary to increase the torque production capacity in said mean thrust direction, which is simple to take into account in the determination of the maneuver plan by increasing the minimum value Γ of the three-axis angular momentum unloading capacity.

In particular embodiments, the maneuver plan is such that the following condition is verified:

$$\|F1 \otimes F2\| > \wedge$$

in which expression:
∧ is a strictly positive scalar value,
‖F1⊗F2‖ corresponds to the norm of the cross product between the thrust forces F1 and F2 of said two orbit control maneuvers of the maneuver plan.

Features of this kind also make it possible to determine a maneuver plan providing a minimum three-axis angular momentum unloading capacity of the angular momentum storage device by means of the value ∧.

In particular embodiments, the thrust forces of said two orbit control maneuvers of the maneuver plan are not aligned in the satellite frame of reference and the times of said two orbit control maneuvers have a temporal spacing different from half the orbital period of the satellite.

In particular embodiments, the movement means including an articulated arm carrying a thruster of the propulsion means, said articulated arm including at least three articulations each having at least one degree of freedom in rotation about a rotation axis, the respective rotation axes of adjacent articulations not being parallel for at least two pairs of adjacent articulations, the thrust force of said thruster, in particular the thrust direction and the point of application of said thrust force, are controlled by commanding the articulations of the articulated arm.

In particular embodiments, the movement means including an attitude control device of the satellite and an articulated arm carrying a thruster of the propulsion means, said articulated arm including at least two articulations each having at least one degree of freedom in rotation, the thrust force of said thruster is controlled by commanding the articulations of the articulated arm and the attitude of the satellite.

In particular embodiments, the articulated arm including at least one additional articulation, during at least one orbit control maneuver of the maneuver plan the propulsion means and the movement means are commanded so as to produce a thrust force in a direction adapted additionally to control the eccentricity of the orbit of the satellite.

In particular embodiments, the eccentricity of the orbit of the satellite is controlled by commanding additional propulsion means of said satellite of fixed orientation relative to said satellite.

In particular embodiments, the times and/or the durations of said two orbit control maneuvers of the maneuver plan are determined so as to control also the eccentricity of the orbit of the satellite during the maneuver plan.

In particular embodiments, an intermediate maneuver plan, adapted to control only the orbit of the satellite, is determined by a ground station and transmitted to the satellite and the maneuver plan to be used is determined by the satellite as a function of said intermediate maneuver plan to perform also the angular momentum unloading.

In particular embodiments, the maneuver plan includes at most two orbit control maneuvers per orbital period of the satellite.

According to a second aspect, the present invention concerns a computer program product characterized in that it includes a set of program code instructions which, when they are executed by a processor, configure said processor to execute a method according to any of the embodiments of the invention of controlling the orbit of a satellite.

According to a third aspect, the present invention concerns a satellite intended to be placed at station in Earth orbit, including propulsion means including at least one thruster and means for moving said propulsion means in a satellite frame of reference centered on a center of mass of said satellite and including three axes X, Y and Z such that, in the satellite on station in Earth orbit, the axis X is parallel to a speed vector of the satellite, the axis Z is directed toward the Earth, and the axis Y is orthogonal to the axes X and Z. Also, the movement means are adapted:
  to modify angles between a thrust direction of each thruster and the axes respectively X, Y of the satellite frame of reference,
  to move each thruster while maintaining a constant thrust direction in the satellite frame of reference so as to produce a torque about any axis in a plane orthogonal to said thrust direction.

The satellite further includes means adapted to command the propulsion means and the movement means according to a maneuver plan including at least two orbit control maneuvers, thrust forces of the propulsion means during said two orbit control maneuvers having respective thrust directions that are not parallel in an inertial frame of reference, said thrust forces of said two orbit control maneuvers being determined so as to control simultaneously the inclination and the longitude of the orbit of the satellite whilst producing torques adapted to unload an angular momentum storage device of said satellite in respective planes that are not parallel in an inertial frame of reference, so that said two orbit control maneuvers of the maneuver plan make it possible to unload said angular momentum storage device about three axes.

In particular embodiments, the satellite may further have one or more of the following features separately or in any technically possible combination.

In particular embodiments, the movement means are arranged on respective opposite sides of the plane XZ formed by the axes X and Z of the satellite frame of reference and non-symmetrically with respect to said plane XZ. Features of this kind make it possible to facilitate unloading the angular momentum storage device.

In particular embodiments, the movement means include an articulated arm carrying a thruster of the propulsion means, said articulated arm including at least three articulations each having at least one degree of freedom in rotation about a rotation axis, the respective rotation axes of adjacent articulations not being parallel to one another for at least two pairs of adjacent articulations.

In particular embodiments, the articulated arm includes an additional articulation having at least one degree of freedom in rotation about a rotation axis.

In particular embodiments, the satellite includes additional propulsion means of fixed orientation relative to said satellite.

In particular embodiments, the propulsion means carried by the movement means are electrical propulsion means.

In particular embodiments, the thrust forces of said two orbit control maneuvers are not aligned in the satellite frame of reference and the times of said two orbit control maneuvers have a temporal spacing different from half the orbital period of the satellite.

According to a fourth aspect, the present invention concerns a satellite orbit control system of a satellite according to any one of the embodiments of the invention, including means configured to determine the maneuver plan so as to provide a predetermined minimum unloading capacity about three axes throughout said two orbit control maneuvers of said maneuver plan.

In particular embodiments, the satellite orbit control system may also have one or more of the following features separately or in any technically possible combination.

In particular embodiments, the means adapted to determine the maneuver plan are distributed between the satellite and a ground station.

DESCRIPTION OF THE FIGURES

The invention will be better understood on reading the following description given by way of nonlimiting example and with reference to the figures, which show.

In these figures, references identical from one figure to another designate identical or analogous elements. For clarity, the elements represented are not to scale, unless otherwise indicated.

DETAILED DESCRIPTION OF EMBODIMENTS

Figure 1:
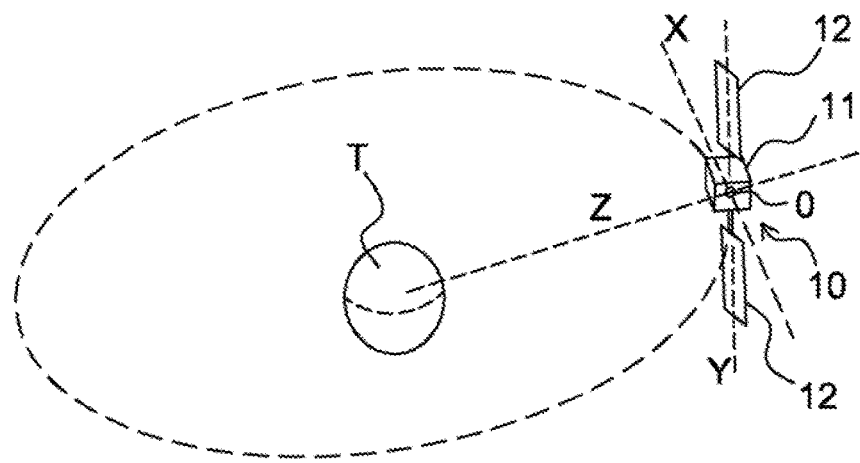
FIG. 1: a schematic representation of an orbit control system of a satellite in Earth orbit.

FIG. 1 represents schematically a system for controlling the orbit of a satellite 10. In the remainder of the description, the nonlimiting situation considered is that of a satellite 10 in GEO orbit. However, in other examples there is nothing to rule out considering other types of spacecrafts (space shuttle, orbital station, etc.) and/or other Earth orbits, for example a geosynchronous orbit, a medium Earth orbit (MEO), a low Earth orbit (LEO), etc.

For the requirements of the description, the satellite 10 is associated with a satellite frame of reference centered on a center of mass O of the satellite 10 and having three axes X, Y, Z. To be more specific, the axis X is parallel to a speed vector of the satellite 10 in an inertial frame of reference, the axis Z is directed towards the center of the Earth T, and the axis Y is orthogonal to the axes X and Z. Each of the axes X, Y and Z of the satellite frame of reference is associated with a respective unit vector ux, uy and uz. The unit vector ux corresponds to the speed vector normalized by the norm of said speed vector, the unit vector uz is oriented from the center of mass O of the satellite 10 toward the center of the Earth T, and the unit vector uy is oriented so that the set (ux, uy, uz) constitutes a direct orthonomic base of the satellite frame of reference.

As shown by FIG. 1, the satellite 10 includes for example a body 11 and two solar generators 12 on respective opposite sides of the body 11. The two solar generators 12 are for example mounted mobile in rotation relative to the body 11 of the satellite 10 about the same rotation axis.

In the remainder of the description, the nonlimiting situation considered is that in which the body 11 of the satellite 10 is of substantially rectangular parallelepiped shape. The body 11 therefore has six faces arranged in parallel pairs and the two solar generators 12 are arranged on respective opposite faces of said body 11, the rotation axis of said two solar generators 12 being substantially orthogonal to said two opposite faces of the body 11 of the satellite 10.

In the remainder of the description the nonlimiting situation considered in that in which the attitude of the satellite 10 is controlled for the requirements of the mission of said satellite 10 so as to be placed in a set point attitude, referred to as the "mission attitude", in which:

a face of the body 11 of the satellite 10, designated "face +Z", carrying for example an instrument of a payload of said satellite 10, is directed toward the Earth and is substantially orthogonal to the axis Z; the face opposite the face +Z, then arranged on the side facing away from the Earth, is designated "face −Z";

the two opposite faces of the body 11 of the satellite 10 on which the two solar generators 12 are arranged, respectively designated "face +Y" (relative to the center of mass O: on the side pointed to by the unit vector uy) and "face −Y", are substantially orthogonal to the axis Y;

the final two opposite faces of the body 11 of the satellite 10, respectively designated by "face +X" (relative to the center of mass O: on the side pointed to by the unit vector ux) and by "face −X", are substantially orthogonal to the axis X.

The satellite 10 also includes a set of actuators adapted to control the orbit and the attitude of said satellite 10 and a control device (not represented in the figures) for said actuators.

For the requirements of attitude control, the satellite 10 includes in particular an angular momentum storage device (not represented in the figures) adapted to store an angular momentum about any axis, i.e. having an angular momentum storage capacity about three axes that are linearly independent. The angular momentum storage device includes a set of inertial actuators such as reaction wheels and/or gyroscopic actuators. For example, the angular momentum storage device includes at least three reaction wheels with respective rotation axes that are linearly independent.

As indicated above, orbit control consists in controlling at least one orbital parameter from the inclination, the longitude and the eccentricity of the orbit of the satellite 10. In the case of a satellite 10 in GEO orbit, it is known that the requirements in terms of orbit control, for example expressed in terms of speed variation required annually (m/s/yr) are mainly imposed by controlling the inclination of the orbit of the satellite 10 (N/S control). Indeed, the order of magnitude of the speed variation required annually for N/S control about the axis Y is 50 m/s/yr, while it is 2-4 m/s/yr for controlling the longitude of the orbit (E/W control) about the axis X.

For the requirements of orbit control, the satellite 10 includes in particular propulsion means including at least one thruster and means for moving said propulsion means in the satellite frame of reference. To be more specific, the movement means are adapted:

to modify the angles between a thrust direction of each thruster and the axes respectively X, Y of the satellite frame of reference, to move each thruster, with a constant thrust direction in the satellite frame of reference, so as to produce a torque about any axis in a plane orthogonal to said thrust direction (including a zero torque by aligning the thrust direction with the center of mass O of the satellite 10).

At the level of the control device, the orbit of the satellite 10 is controlled by commanding the propulsion means and the movement means in accordance with a maneuver plan including orbit control maneuvers during which the propulsion means are activated.

With movement means of this kind, it is possible during the same orbit control maneuver and with the same thruster to control the thrust direction of said thruster so as to control simultaneously the inclination of the orbit (by adjusting the component of the thrust direction along the axis Y) and the longitude of the orbit (by adjusting the component of the thrust direction along the axis X). It is also possible, again during the same orbit control maneuver and with the same thruster, to produce if necessary a torque for unloading the angular momentum storage device about any axis in the plane orthogonal to said thrust direction by moving the point of application of the thrust force relative to the center of mass of the satellite 10.

In order to be able to unload the angular momentum storage device regardless of the direction of the stored angular momentum, the maneuver plan advantageously includes at least two orbit control maneuvers in which the respective thrust forces of the propulsion means are not parallel in an inertial frame of reference. Accordingly, during said two orbit control maneuvers, the planes in which it is possible to produce a torque for angular momentum unloading are not parallel so that, throughout said two orbit control maneuvers, the vector space in which it is possible to produce a torque for angular momentum unloading is three-dimensional.

The thrust forces of the maneuver plan are therefore determined as a function of predetermined requirements for controlling the inclination and the longitude of the orbit of the satellite 10 and as a function of a predetermined requirement for unloading the angular momentum storage device of said satellite 10 so as to control simultaneously the inclination and the longitude of the orbit as well as unloading the angular momentum storage device of said satellite 10.

In the prior art, the E/W maneuvers were performed at a lower frequency than the plasma N/S maneuvers. According to the invention, E/W control is performed simultaneously with N/S control. Consequently, the frequency of E/W control is higher than the frequency of prior art E/W maneuvers so that it is possible for example to reduce the longitude excursion relative to that of the prior art.

Moreover, the number of orbit control maneuvers is reduced compared to the prior art in that the inclination and the longitude of the orbit of the satellite 10 are controlled simultaneously. The number of activations of the propulsion means is therefore also reduced and the consumption may be reduced, in particular in the case of chemical propulsion means.

Finally, the total number of orbit control maneuvers and angular momentum storage device unloading maneuvers is also reduced compared to the prior art in that it is no longer necessary to employ dedicated angular momentum unloading maneuvers. Moreover, the same propulsion means are used both to control the orbit of the satellite 10 and for unloading the angular momentum storage device so that it is possible to reduce the number of thrusters on the satellite 10. However, there is nothing to rule out providing additional propulsion means dedicated to unloading the angular momentum storage device. If appropriate, it will be possible to reduce the capacity of said additional propulsion means and/or of the angular momentum storage device given the fact that the propulsion means employed to control the orbit of the satellite 10 contribute also to regular unloading of said angular momentum storage device.

In preferred embodiments it is also possible, again during the same orbit control maneuver, to control also the eccentricity of the orbit, for example by adjusting the times and/or the durations of said at least two orbit control maneuvers of the maneuver plan as a function of a predetermined requirement for controlling the eccentricity of the orbit. In embodiments of this kind, all the orbital parameters are therefore controlled simultaneously, furthermore with unloading the angular momentum storage device.

In the case of a satellite in GEO orbit (or more generally in geosynchronous orbit), the maneuver plan preferably includes in total two orbit control maneuvers per orbital period (approximately 24 hours). For the requirements of controlling the inclination of the orbit, the nominal temporal spacing of the orbit control maneuvers is approximately 12 hours. However, the optimum thrust directions for correcting the dominant disturbances (inclination) being oriented according to the normal to the orbit, the thrust forces determined only for controlling disturbances would have thrust directions that would be substantially parallel in an inertial frame of reference. Consequently, in preferred embodiments, there is imposed a misalignment between said thrust directions and/or there is imposed a temporal offset between the orbit control maneuvers relative to the prior art temporal spacing.

Figure 2:
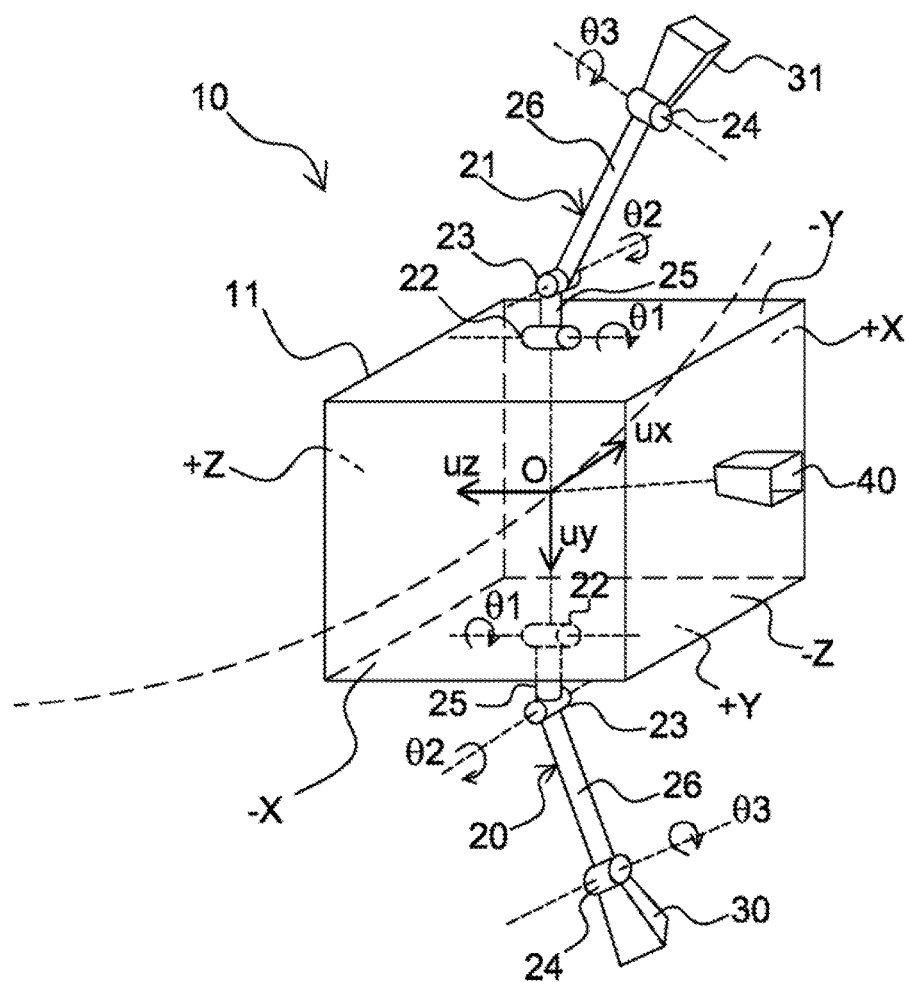
FIG. 2: a schematic representation of one particular embodiment of a satellite according to the invention.

FIG. 2 represents one particular embodiment of a satellite 10 including movement means adapted to control simultaneously the inclination and the longitude of the orbit of the satellite 10 together with at least partial unloading of the angular momentum storage device. To clarify FIG. 2, the solar generators 12 of the satellite are not represented.

In the example illustrated by FIG. 2, the movement means include two articulated arms 20, 21, each articulated arm 20, 21 carrying a thruster 30, 31. In the remainder of the description, the nonlimiting situation considered is that in which the thrusters 30, 31 are electrical thrusters (electrothermal, electrostatic, plasma, etc.). However, there is nothing to rule out, according to other examples, one or both thrusters 30, 31 being chemical thrusters (cold gas, liquid propellants, etc.).

In the nonlimiting example illustrated by FIG. 2 the articulated arms 20, 21 are respectively arranged on the face +Y and the face −Y of the body 11 of the satellite 10. The articulated arms 20, 21 are for example used for the South control and the North control of the inclination of the orbit of the satellite 10 by alternately activating either the thruster 30 or the thruster 31.

The articulated arm 20 is preferably fixed to said face +Y at a fixed point that substantially corresponds to the orthogonal projection of a theoretical center of mass of the satellite 10 onto said face +Y. The theoretical center of mass (considered to coincide with the real center of mass O in FIG. 2) corresponds for example to a pre-launch estimate of the center of mass of the satellite 10 on station in the GEO orbit. In other words, the fixing point of the articulated arm is such that the torque applied to the satellite 10 is substantially zero when the articulated arm 20 is deployed substantially orthogonally to the face +Y and imposes a thrust direction of the thruster 30 substantially orthogonal to said face +Y. If the satellite 10 is also in the mission attitude, then said thrust direction is orthogonal to the orbit plane coinciding with the plane XZ, and therefore allows control of only the inclination of the orbit.

In an analogous manner, the articulated arm 21 is fixed to said face −Y at a fixed point that substantially corresponds to the orthogonal projection of the theoretical center of mass of the satellite 10 onto said face −Y. The torque applied to the satellite 10 is therefore substantially zero when the articulated arm 21 is deployed substantially orthogonally to the face −Y and imposes a direction of thrust of the thruster 31 substantially orthogonal to said face −Y. If the satellite 10 is also in the mission attitude, then said thrust direction is orthogonal to the orbit plane coinciding with the plane XZ, and therefore allows control of only the inclination of the orbit.

In the remainder of the description, "N/S control position" refers to the position of the articulated arm 20 (respectively the articulated arm 21) in which said articulated arm is deployed substantially orthogonally to the face +Y (respectively the face −Y) and imposes a thrust direction of the thruster 30 (respectively the thruster 31) that is substantially orthogonal to said face +Y (respectively said face −Y) so that the thrust force of said thruster 30 (respectively said thruster 31) is substantially aligned with the theoretical center of mass of the satellite 10.

In the example illustrated by FIG. 2, each articulated arm 20, 21 includes three articulations 22, 23, 24, each articulation having at least one degree of freedom in rotation about a rotation axis. The articulations 22 and 23 are linked to one another and separated by a link 25 and the articulations 23 and 24 are linked to one another and separated by a link 26. Moreover, for each articulated arm 20, 21, the respective rotation axes of adjacent articulations 22, 23, 24 are not parallel in each of the two pairs of adjacent articulations.

Each articulated arm 20, 21 therefore offers three degrees of freedom for modifying the thrust direction and the point of application of the thrust force of the thruster 30, 31 relative to the N/S control position. For example, a first degree of freedom may be used to control the component of the thrust direction along the axis X (E/W control) and the other two degrees of freedom may be used to control the position of the point of application of the thrust force relative to the center of mass O of the satellite 10 (unloading of the angular momentum storage device).

As shown in the example from FIG. 2, when the satellite 10 is in the mission attitude the rotation axis of the articulation 22 of each articulated arm 20, 21 is preferably substantially parallel to the axis Z. The rotation axis of the articulation 23 of each articulated arm 20, 21 is substantially orthogonal both to the link 25 and to the rotation axis of the articulation 22. The rotation axis of the articulation 24 of each articulated arm 20, 21 is substantially orthogonal both to the link 26 and to the rotation axis of the articulation 23.

To control the thrust direction and the point of application of the thrust force, the control device controls the rotation angles of the articulations 22, 23, 24, respectively designated θ1, θ2 and θ3. The articulations 22, 23, 24 are for example such that, when the satellite 10 is on station in the GEO orbit, each of the rotation angles θ1, θ2 and θ3 of each articulated arm 20, 21 can take any value in a range of values [−30°, 30°] around the N/S control position of said articulated arm.

In particular embodiments, and as shown in FIG. 2, the satellite 10 includes additional propulsion means of fixed orientation relative to said satellite 10. For example, the satellite 10 includes a (chemical or electrical) thruster 40 fixed to the face −Z of the body 11 of the satellite 10 and of fixed orientation such that the thrust direction of said thruster 40 is substantially orthogonal to said face −Z. The point of fixing of the thruster 40 to the face −Z preferably substantially corresponds to the orthogonal projection of the theoretical center of mass of the satellite 10 on said face −Z. The torque applied to the satellite 10 by said thruster 40 is therefore substantially zero when the center of mass O of the satellite 10 is close to the theoretical center of mass. Note that, in other examples, the satellite 10 may include a plurality of thrusters 40 of fixed orientation relative to the satellite 10.

The thruster 40 is used to control the eccentricity of the orbit. It can be activated simultaneously with the thrusters 30, 31 carried by the articulated arms 20, 21 and/or during dedicated eccentricity control maneuvers distinct from the N/S and E/W control maneuvers of the orbit.

Figure 6:
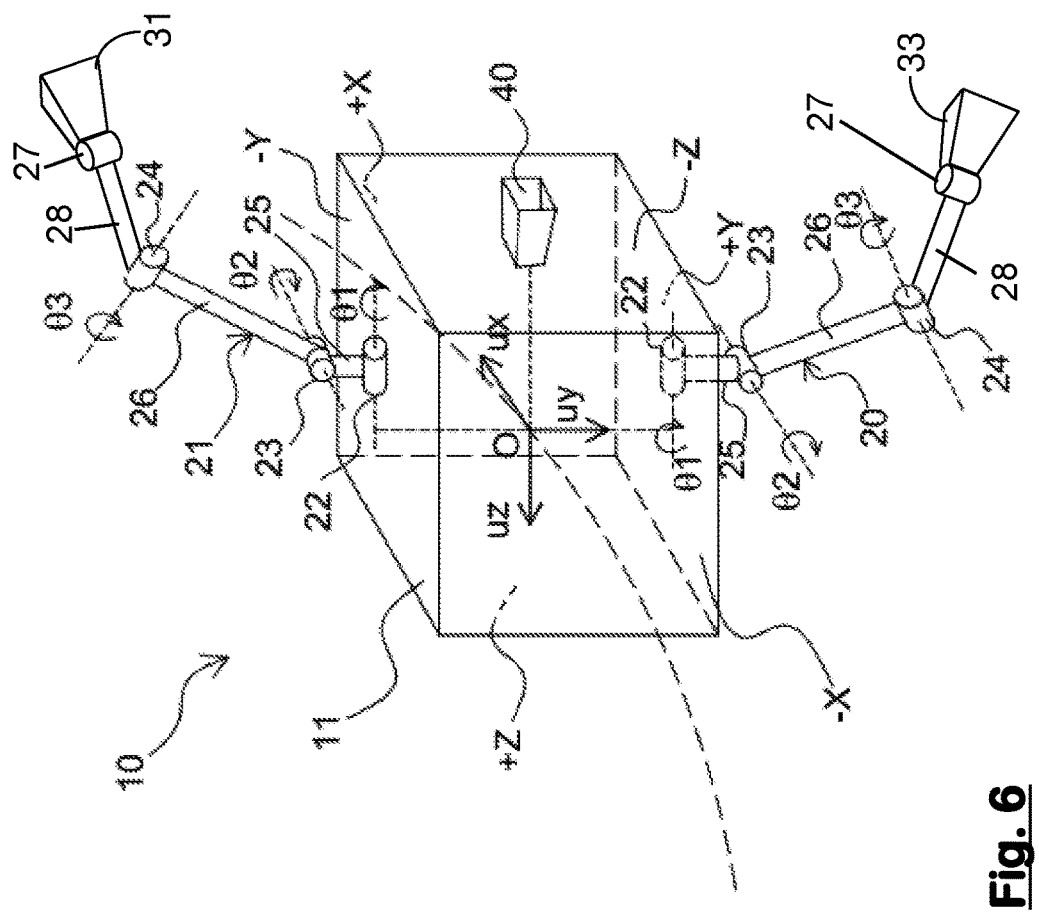
FIG. 6: a schematic representation of another embodiment of the satellite according to the invention.

In addition to or instead of the thruster 40 of fixed orientation relative to the satellite 10, at least one of the articulated arms 20, 21 may, in particular embodiments, as shown in FIG. 6, include an additional articulation 27 having at least one degree of freedom in rotation about a rotation axis. This additional articulation 27 is for example linked to the articulation 24 by an additional link 28 and the rotation axis of said additional articulation is preferably orthogonal to the rotation axis of the articulation 24 and to said additional link 28. Each articulated arm 20, 21 including an additional articulation 27 of this kind then has an additional degree of freedom, which may for example be used by the control device to control all the orbital parameters, including the eccentricity, at the same time as the N/S and E/W control maneuvers of the orbit of the satellite 10.

Figure 3:
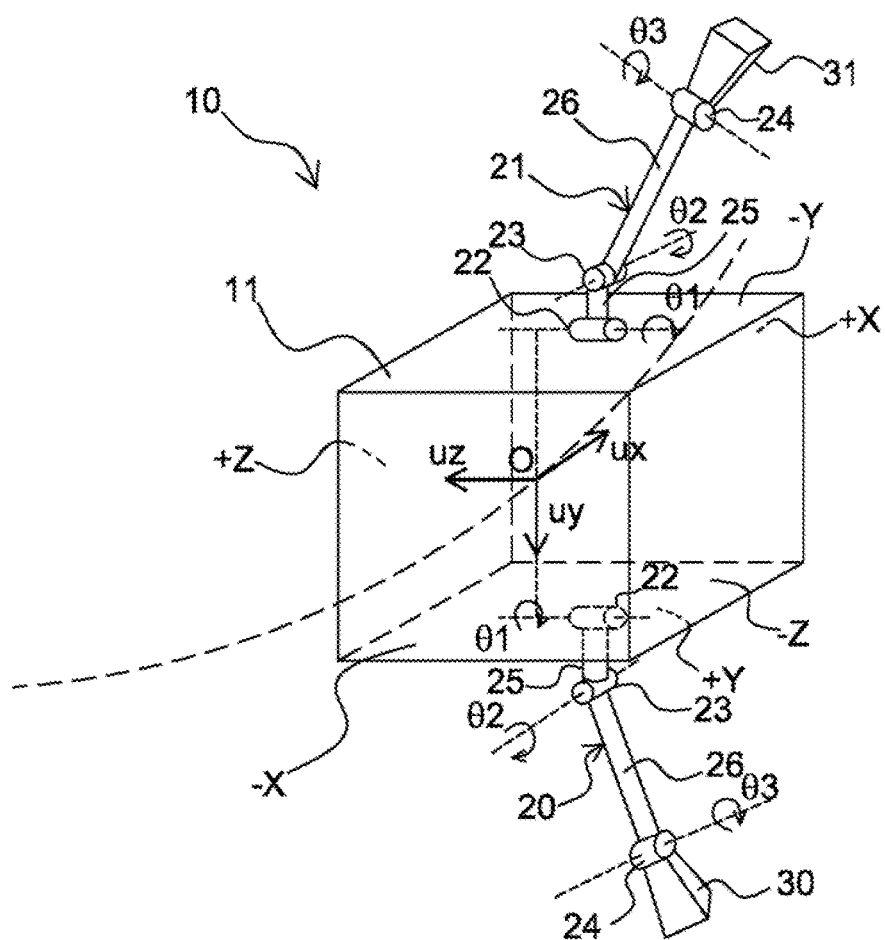
FIG. 3: a schematic representation of one preferred embodiment of a satellite according to the invention.
Figure 4:
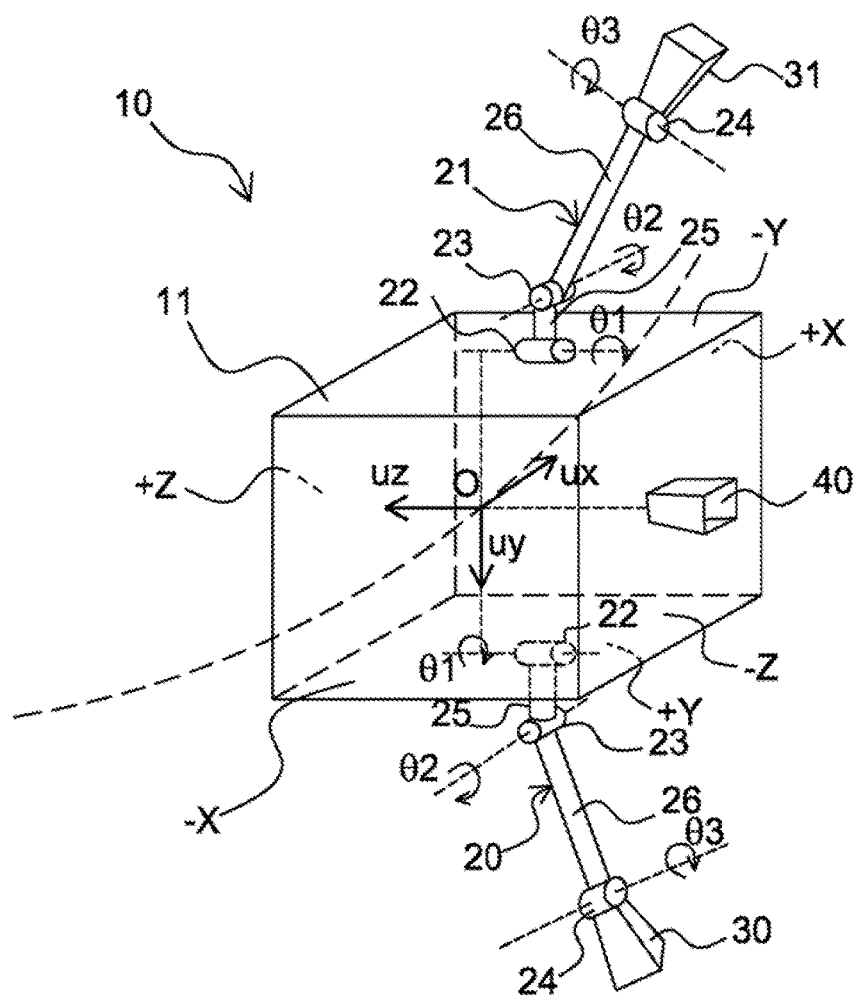
FIG. 4: a schematic representation of a variant embodiment of the satellite from FIG. 3, FIG. 5: a diagram representing the main steps of a method according to the invention of controlling the orbit of a satellite.

FIG. 3 represents a preferred embodiment of a satellite 10 that includes the same movement means (articulated arms 20 and 21) and the same propulsion means (thrusters 30 and 31) carried by said movement means as the satellite 10 illustrated by FIG. 2. As illustrated by FIG. 3, the articulated arm 20 is advantageously fixed to the face +Y at a fixed point that is offset along the axis Z relative to the orthogonal projection of the theoretical center of mass of the satellite 10 on said face +Y. Similarly, the articulated arm 21 is advantageously fixed to the face −Y at a fixed point that is offset along the axis Z relative to the orthogonal projection of the theoretical center of mass of the satellite 10 on said face −Y. In the example illustrated by FIG. 3, the N/S control position of the articulated arm 20 (respectively the articulated arm 21) corresponds to the position in which the link 25 is oriented substantially orthogonally to the face +Y (respectively the face −Y) and the link 26 is oriented substantially in the direction of the theoretical center of mass of the satellite 10 and imposes a thrust force of the thruster 30 (respectively the thruster 31) that is substantially aligned with said theoretical center of mass of the satellite 10. This kind of configuration of the articulated arms 20, 21 compared to that illustrated in FIG. 2 makes it possible to facilitate the control of the eccentricity of the orbit of the satellite 10 in that the thrust force of the thruster 30 (respectively the thruster 31) in the N/S control position includes a non-zero component along the axis Z without producing any torque. It is therefore possible, with only the articulated arms 20, 21 and only the thrusters 30, 31, to control all the orbital parameters, including the eccentricity of the orbit of the satellite 10, for example by adjusting also the durations and/or the times of the orbit control maneuvers of the maneuver plan. As is the case in the nonlimiting example illustrated by FIG. 3, the satellite 10 can therefore have no thruster 40 of fixed orientation. However, as illustrated by FIG. 4, there is nothing to rule out nevertheless equipping the satellite 10 of FIG. 3 with a thruster 40 of fixed orientation, for reasons of redundancy, for example, to overcome a failure of one of the thrusters 30, 31.

In the examples illustrated by FIGS. 2, 3, 4 and 6, the movement means, i.e. the articulated arms 20, 21, are arranged symmetrically with respect to the plane XZ formed by the axes X and Z of the satellite frame of reference. In particular, in these examples, the fixing points of the articulated arms 20, 21 are arranged on substantially the same axis parallel to the axis Y so that the coordinates along the axes X and Z of said fixing points of said articulated arms 20, 21 in a satellite frame of reference centered on the theoretical center of mass are identical.

In alternative preferred variant embodiments, not illustrated by figures, the articulated arms 20, 21 are arranged in a non-symmetrical manner relative to the plane XZ. In particular, the fixing points of the articulated arms 20, 21 being arranged on respective opposite sides of the plane XZ in relation to the satellite frame of reference centered on the center of mass O, for example on the faces +Y and −Y, respectively, the coordinates along the axes X and Z of said fixing points of said articulated arms 20, 21 in said satellite frame of reference centered on the center of mass O are preferably not identical. In other words, the fixing points of the articulated arms 20, 21 are projected orthogonally onto the plane XZ at respective different points. Features of this kind make it possible to facilitate unloading the angular momentum storage device of the satellite 10.

As discussed above, in the examples illustrated by FIGS. 2, 3, 4 and 6, the movement means include two articulated arms 20, 21 each including at least three articulations 22, 23, 24.

However, other embodiments of the movement means are possible, without the principle of the invention being modified by this. In particular, in other embodiments, there is nothing to rule out having articulated arms including two articulations each having at least one degree of freedom in rotation about a rotation axis, the rotation axes of said two articulations not being parallel. In this case, each articulated arm has two degrees of freedom and it is possible to obtain an additional degree of freedom by modifying the attitude of the satellite 10 in the satellite frame of reference during orbit control maneuvers. If necessary, the movement means further include a device for controlling the attitude of the satellite 10, which may be the angular momentum storage device.

Moreover, a satellite 10 according to the invention has been described with reference to FIGS. 2, 3, 4 and 6 considering that the movement means include two articulated arms 20, 21. In other examples, there is nothing to rule out having a number of articulated arms other than two. In particular, the movement means may include only one articulated arm. In the case of a single articulated arm, said articulated arm is for example fixed to the face −Z of the body of the satellite 10 or to one of the two faces +Y and −Y, as illustrated by FIGS. 2, 3, 4 and 6. In the case of a single articulated arm fixed to the face −Y (or to the face +Y) of the body 11 of the satellite 10, it is for example possible, for South control (respectively North control) of the orbit of the satellite 10 to cause the satellite 10 to turn 180° relative to the mission attitude about the axis Z of the satellite frame of reference.

As previously indicated, the control device controls the orbit of the satellite 10 as a function of a maneuver plan including at least two orbit control maneuvers with thrust forces with respective thrust directions that are not parallel in an inertial frame of reference. Moreover, each of said thrust forces is determined so as to control simultaneously the inclination and the longitude (and where applicable the eccentricity) of the orbit of the satellite 10 as well as to produce a torque for unloading the angular momentum storage device of said satellite 10.

The control device includes for example at least one processor and at least one electronic memory in which is stored a computer program product in the form of a set of program code instructions to be executed to command the movement means and the propulsion means of the satellite 10 according to a maneuver plan of this kind. In a variant, the control device includes one or more programmable logic circuits, of FPGA, PLD, etc. type, and/or application-specific integrated circuits (ASIC) adapted to carry out some or all of said steps of controlling the movement means and the propulsion means according to a maneuver plan of this kind.

In other words, the control device includes a set of means configured in software (dedicated computer program product) and/or hardware (FPGA, PLD, ASIC, etc.) to control the movement means and the propulsion means of the satellite 10 according to a maneuver plan of this kind.

The main parameters of the maneuver plan to be adjusted are:
  the starting times of the various orbit control maneuvers of the maneuver plan, i.e. the times of activation of the propulsion means,
  the durations of the various orbit control maneuvers of the maneuver plan, i.e. the durations of activation of the propulsion means,
  the thrust directions and the points of application relative to the center of mass O of the satellite 10 of the respective thrust forces of the various orbit control maneuvers.

In the remainder of the description, the nonlimiting situation considered is that in which the thrust direction and the point of application of each thrust force of the maneuver plan are fixed relative to the satellite 10 throughout the duration of the corresponding orbit control maneuver. In other words, in the case of the movement means illustrated by the FIGS. 2, 3, 4 and 6, the values of the angles $\theta 1$, $\theta 2$ and $\theta 3$ of the articulations 22, 23, 24 of the articulated arms 20, 21 are not modified during a same orbit control maneuver. However, in other examples, there is nothing to rule out causing said values of the angles $\theta 1$, $\theta 2$ and $\theta 3$ to vary in order to increase the number of degrees of freedom of the orbit control system.

It is also possible to adjust other parameters such as the respective durations of the various orbit control maneuvers of the maneuver plan and/or the thrust norms of the respective thrust forces of said different orbit control maneuvers (in the case of propulsion means the thrust norm of which can be controlled).

F1 designates the thrust force of the propulsion means during the first of the two orbit control maneuvers, which begins at a time T1, and F2 designates the thrust force of the propulsion means during the second of the two orbit control maneuvers, which begins at a time T2. The thrust forces F1 and F2 are expressed in the satellite frame of reference according to the following expressions:

$$F1 = F1x \cdot ux(T1) + F1y \cdot uy(T1) + F1z \cdot uz(T1)$$

$$F2 = F2x \cdot ux(T2) + F2y \cdot uy(T2) + F2z \cdot uz(T2)$$

in which expression:
  (F1x, F1y, F1z) are the components of the thrust force F1 in the satellite frame of reference at the time T1, the unit vectors of which are (ux(T1), uy(T1), uz(T1)), (F2x, F2y, F2z) are the components of the thrust force F2 in the satellite frame of reference at the time T2, the unit vectors of which are (ux(T2), uy(T2), uz(T2)).

In the case of a satellite 10 as illustrated by FIG. 3 in which eccentricity control is performed by means of thrusters 30, 31 carried by the articulated arms 20, 21, then the system of equations to be solved comprises nine equations, relating to the following parameters:

ΔVx(T1) and ΔVx(T2), scalar parameters that correspond to the requirements in terms of speed variation required along the axis X (E/W control) during the first orbit control maneuver and the second maneuver of the maneuver plan, ΔVy(T1) and ΔVy(T2), scalar parameters that correspond to the requirements in terms of speed variation required along the axis Y (N/S control), during the first orbit control maneuver and the second maneuver of the maneuver plan, ΔVz(T1) and ΔVz(T2), scalar parameters that correspond to the requirements in terms of speed variation required along the axis Z (eccentricity control) during the first orbit control maneuver and the second maneuver of the maneuver plan, ΔH, a vector of three scalar parameters corresponding to the components of the angular momentum to be unloaded from the angular momentum storage device at the end of the two orbit control maneuvers, expressed in the inertial frame of reference.

By adjusting the durations and the times of the two orbit control maneuvers and the values of the angles θ1(T1), θ2(T1), θ3(T1), θ1(T2), θ2(T2) and θ3(T2) of the articulations 22, 23, 24 of the articulated arms 20, 21 during said two orbit control maneuvers, a sufficient number of degrees of freedom is then available for solving the aforementioned system of equations.

In the case of a satellite 10 in which eccentricity control is performed by means of a thruster 40 of fixed orientation relative to the satellite 10, and in the case where the satellite 10 does not have one of the two thrusters 30 or 31 (by design or because of a temporary or permanent failure of said thruster or of the articulated arm carrying it), then the loss of the associated degrees of freedom can be compensated by an increase in the number of orbit control maneuvers. In this case the maneuver plan is preferably executed with a longer time horizon, in order not to increase the number of orbit control maneuvers per orbital period. For example, it is possible to consider a maneuver plan spread over a number of orbital periods, preferably including at most two orbit control maneuvers per orbital period. The advantages are that the operational load on the ground is unchanged after the failure and that there is no increase in the number of ON/OFF sequences of the thrusters (important in relation to the service life, above all after a failure). Operation with a higher frequency of maneuvers, to have better accuracy in orbit control is nevertheless equally possible.

In preferred embodiments, the maneuver plan is further determined subject to the following condition:

$$|EN1+EN2+RN \cdot \sin(\Delta T)| > \Gamma \quad (1)$$

in which expression:

Γ is a strictly positive scalar value representative of a required minimum three-axis unloading capacity for the angular momentum storage device of the satellite 10, EN1 is equal to the ratio F1x/F1y, EN2 is equal to the ratio F2x/F2y, RN is equal to the ratio F1z/F1y or to the ratio F2z/F2y, ΔT is equal to $2\pi \cdot (T2-T1-Torb/2)/Torb$, in which expression Torb is the orbital period (approximately 24 hours in the case of a geosynchronous orbit).

ΔT is therefore representative of the temporal shift relative to the nominal temporal spacing (Torb/2, or 12 hours in the case of a geosynchronous orbit) between the orbit control maneuvers. If ΔT is non-zero modulo π, then the thrust forces F1 and F2, determined only for the control of the inclination and the longitude of the orbit, will be non-parallel. Moreover, the ratios EN1 and EN2 make it possible to impose a misalignment between said thrust forces F1 and F2 (by imposing a non-zero value for the sum EN1+EN2). Finally, the above general expression (1) makes it possible to ensure that, if there are imposed both a misalignment of the thrust forces F1 and F2 in the satellite frame of reference and a temporal offset relative to the nominal temporal spacing, these do not cancel one another out in the inertial frame of reference.

The value Γ is for example a predefined value that is constant over time, or a value that can be adjusted over time as a function for example of the angular momentum ΔH to be unloaded. In particular, it is clear that if the thrust forces F1 and F2 are almost parallel in the inertial frame of reference, then the angular momentum unloading capacity is low in the mean thrust direction of said thrust forces F1 and F2. The more the value Γ increases, the more the absolute value of the scalar product of the thrust directions of the thrust forces F1 and F2 in the inertial frame of reference tends to decrease, so that the three-axis unloading capacity of the angular momentum storage device increases.

More generally, it is possible to consider conditions other than that of the expression (1) to ensure a predetermined minimum capacity for three-axis unloading of the angular momentum storage device of the satellite 10 throughout two orbit control maneuvers of the maneuver plan. According to another nonlimiting example, the maneuver schedule is determined subject to the following condition:

$$\|F1 \otimes F2\| > \wedge \quad (2)$$

in which expression:

∧ is a strictly positive scalar value representative of a minimum required three-axis unloading capacity for the angular momentum storage device of the satellite 10, $\|F1 \otimes F2\|$ corresponds to the norm of the cross product between the thrust forces F1 and F2 of said two orbit control maneuvers of the maneuver schedule.

Moreover, it is equally possible to consider a plurality of conditions when determining the maneuver plan. For example, it is possible to determine a maneuver plan that verifies both condition (1) and condition (2).

The maneuver plan is for example determined directly by the control device of the satellite 10. Alternatively, the maneuver plan may be determined by a ground station of the orbit control system and transmitted to the satellite 10 to be executed by the control device. According to other examples, the maneuver plan may equally be determined conjointly by the satellite 10 and the ground station.

Figure 5:
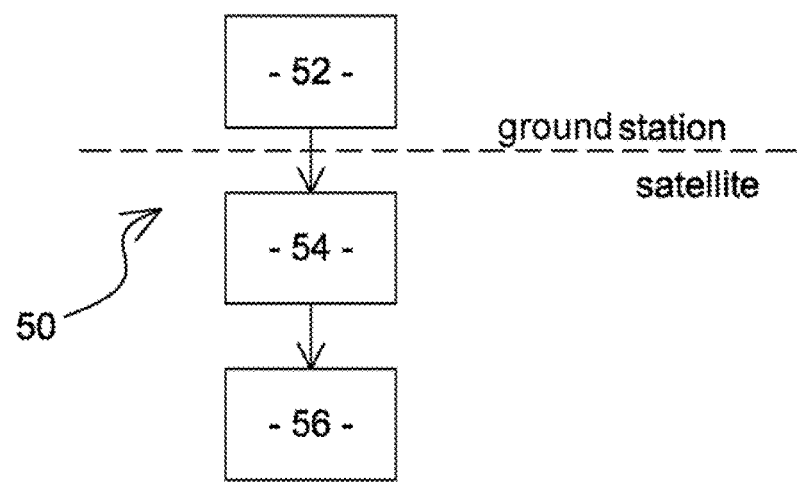

FIG. 5 represents schematically the main steps of a preferred embodiment of an orbit control method 50 in which the maneuver plan is determined conjointly by a ground station and by the satellite 10. To this end, the ground station and the satellite 10 include respective conventional communication means that enable them to exchange data.

As illustrated by FIG. 5, the orbit control method 50 includes firstly a step 52 of determining an intermediate maneuver plan including two orbit control maneuvers the thrust forces of which, having non-parallel thrust directions, are adapted to control simultaneously a plurality of orbital parameters (the inclination, the longitude and where applicable the eccentricity) of the orbit of the satellite 10 without modifying its angular momentum.

For example, during the step 52 of determining the intermediate maneuver plan, the ground station determines the following parameters:

the times T1 and T2 of starting the orbit control maneuvers, the durations of the two orbit control maneuvers, intermediate values of the angles θ1(T1), θ2(T1), θ3(T1), θ1(T2), θ2(T2) and θ3(T2) making it possible to produce thrust forces that simultaneously control the inclination and the longitude of the orbit of the satellite 10 without producing any torque.

These parameters are for example determined as a function of the scalar parameters $\Delta Vx(T1)$, $\Delta Vx(T2)$, $\Delta Vy(T1)$, $\Delta Vy(T2)$ (and where applicable $\Delta Vz(T1)$ and $\Delta Vz(T2)$), received from the satellite 10 or determined directly by the ground station.

The intermediate maneuver plan is preferably determined by the ground station so as to ensure a minimum three-axis unloading capacity, for example subject to the condition $|EN1+EN2+RN \cdot \sin(\Delta T)|>\Gamma$. If the value $\Gamma$ is not constant over time, it is for example received from the satellite 10 or determined on the basis of data received from the satellite 10, such as the angular momentum $\Delta H$ to be unloaded.

Once it has been determined by the ground station, the intermediate maneuver plan is transmitted to the satellite 10.

The orbit control method 50 then includes a step 54 during which the control device determines the maneuver plan to apply, i.e. the maneuver plan the thrust forces of which are further adapted to produce torques for unloading the angular momentum storage device.

To be more specific, this step 54 aims at determining new values of the angles θ1(T1), θ2(T1), θ3(T1), θ1(T2), θ2(T2) and θ3(T2) further making it possible to unload an angular momentum $\Delta H$ of the angular momentum storage device after the two orbit control maneuvers. Said new values of the angles θ1(T1), θ2(T1), θ3(T1), θ1(T2), θ2(T2) and θ3(T2) are determined as a function of the angular momentum $\Delta H$ to be unloaded and as a function of the intermediate values of said angles given by the intermediate maneuver plan, for example by linearizing the system of equations around said intermediate values. The thrust vectors of the thrust forces of the maneuver plan determined during the step 54 are preferably identical to those of the intermediate maneuver plan. In other words, only the points of application of said thrust forces are modified during the step 54 in order to produce thrust forces appropriate for producing torques for unloading the angular momentum storage device.

The orbit control method 50 then includes a step 56 during which the control system controls the movement means and the propulsion means in accordance with the maneuver plan determined during the step 54.

As indicated above, the maneuver plan to be used can also be determined entirely by the ground station. Where appropriate, the step 54 of determining the maneuver plan to be used, as a function inter alia of the intermediate maneuver plan, is executed by the ground station. Moreover, according to other examples, there is nothing to rule out determining the maneuver plan to be used directly i.e. without going via the determination of an intermediate maneuver plan.

The ground station includes for example at least one processor and at least one electronic memory in which is stored a computer program product in the form of a set of program code instructions to be executed to implement the associated steps of the orbit control method 50 of the satellite 10. In a variant, the ground station includes one or more programmable logic circuits, of FPGA, PLD, etc. type, and/or application-specific integrated circuits (ASIC) adapted to execute some or all of said associated steps of the orbit control method 50.

In other words, the ground station includes means configured in software (dedicated computer program product) and/or hardware (FPGA, PLD, ASIC, etc.) for executing the various steps of the orbit control method 50 that are executed by said ground station.

More generally, it is noted that the embodiments and uses considered above have been described by way of nonlimiting examples and that other variants can therefore be envisaged.

In particular, the invention has been described considering a maneuver plan including two orbit control maneuvers per orbital period. Indeed, the invention makes it possible, in only two orbit control maneuvers per orbital period, to control the inclination, the longitude and, in particular embodiments, the eccentricity of the orbit of the satellite 10, at the same time as unloading with respect to three axes the angular momentum storage device of said satellite 10. However, according to other examples, there is nothing to rule out having a different number of orbit control maneuvers per orbital period, greater than or less than two. For example, the maneuver plan may include one orbit control maneuver per orbital period and where appropriate be defined over a duration equal to or greater than two orbital periods.

Moreover, note that the movement means of the propulsion means described above, in particular the articulated arms 20, 21, may also be used when placing the satellite 10 at its station, for example during a geostationary transfer orbit (GTO) phase toward a GEO orbit. For example, the articulated arms 20, 21 may be controlled so that the thrusters 30, 31 produce thrust forces in thrust directions substantially orthogonal to the face −Z to move the satellite 10 in the direction of the unit vector uz. In the case of a satellite 10 including a thruster 40 of fixed orientation such that the thrust direction of said thruster 40 is substantially orthogonal to the face −Z, the latter is also used for placing the satellite 10 at station. Where appropriate, the thrusters 30, 31 carried by the articulated arms 20, 21 and the thruster 40 are preferably all electrical thrusters, so that a configuration of this kind makes possible all-electric placement of the satellite 10 at its station.

The invention claimed is:

1. A method for controlling an orbit of a satellite on station in an Earth orbit, the satellite comprising an angular momentum device, a propulsion system comprising at least one thruster and a satellite frame of reference centered on a center of mass of the satellite, the satellite frame of reference includes three axes X, Y and Z, the axis X is parallel to a speed vector of the satellite, the axis Z is directed toward the Earth, and the axis Y is orthogonal to the axes X and Z, the method comprises steps of:

determining an inclination control requirement for the orbit of the satellite;

determining a longitude control requirement for the orbit of the satellite;

determining an angular momentum unload requirement for the angular momentum storage device of the satellite;

determining a maneuver plan comprising at least two orbit control maneuvers with respective thrust forces of the propulsion system having respective thrust directions that are not parallel in an inertial frame of reference;

determining the thrust forces as a function of the inclination control requirement, of the longitude control requirement and of the angular momentum unload requirement, wherein the thrust forces of said at least two orbit control maneuvers are determined to control simultaneously an inclination and a longitude of the orbit of the satellite while producing torques configured to unload the angular momentum storage device of the satellite in respective planes that are not parallel in the inertial frame of reference, so that said at least two orbit control maneuvers of the maneuver plan unloads the angular momentum storage device about the three axes;

controlling simultaneously the inclination and the longitude of the orbit of the satellite and an angular momentum stored in the angular momentum storage device by commanding the propulsion system and a transporter of the propulsion system to apply the thrust forces of said at least two orbit control maneuvers of the maneuver plan;

wherein the transporter is commanded to:
modify angles between a thrust direction of said at least one thruster and the axes X, Y of the satellite frame of reference, respectively;
move said at least one thruster while maintaining a constant thrust direction in the satellite frame of reference to produce a torque about any axis in a plane orthogonal to said thrust direction.

2. The method as claimed in claim 1, wherein the maneuver plan is determined to provide a predetermined minimum unloading capacity about the three axes throughout said at least two orbit control maneuvers of the maneuver plan.

3. The method as claimed in claim 1, wherein the maneuver plan verifies a following condition:

$$|EN1+EN2+RN \cdot \sin(\Delta T)| > \Gamma$$

in which expression:
$\Gamma$ is a strictly positive scalar value,
EN1 corresponds to a ratio between a component along the axis X and a component along the axis Y of a thrust force of a first orbit control maneuver of the maneuver plan,
EN2 corresponds to a ratio between a component along the axis X and a component along the axis Y of a thrust force of a second orbit control maneuver of the maneuver plan,
RN corresponds to a ratio between a component along the axis Z and the component along the axis Y of the thrust force of the first or second orbit control maneuver of the maneuver plan, and
$\Delta T$ is equal to $2\pi \cdot (T2-T1-Torb/2)/Torb$, in which expression T1 and T2 are times of the first and second orbit control maneuvers and Torb is an orbital period of the satellite.

4. The method as claimed in claim 1, wherein the maneuver plan verifies a following condition:

$$\|F1 \otimes F2\| > \wedge$$

in which expression:
$\wedge$ is a strictly positive scalar value, and
$\|F1 \otimes F2\|$ corresponds to a norm of a cross product between the thrust forces F1 and F2 of two orbit control maneuvers of the maneuver plan.

5. The method as claimed in claim 1, wherein the thrust forces of said at least two orbit control maneuvers are not aligned in the satellite frame of reference and times of said at least two orbit control maneuvers have a temporal spacing different from half of an orbital period of the satellite.

6. The method as claimed in claim 1, wherein the transporter comprises an articulated arm carrying said at least one thruster of the propulsion system, the articulated arm comprises at least three articulations, each articulation having at least one degree of freedom in rotation about a rotation axis, respective rotation axes of adjacent articulations are not parallel for at least two pairs of adjacent articulations, a thrust force of said at least one thruster is controlled by commanding the articulations of the articulated arm.

7. The method as claimed in claim 6, wherein the articulated arm comprises at least one additional articulation, during at least one orbit control maneuver of the maneuver plan, wherein the method further comprises steps of:
determining an eccentricity control requirement for the orbit of the satellite; and
determining the thrust forces of said at least two orbit control maneuvers of the maneuver plan as a function of the eccentricity control requirement to additionally control the eccentricity of the orbit of the satellite during the maneuver plan.

8. The method as claimed in claim 6, wherein an eccentricity of the orbit of the satellite is controlled by commanding an additional thruster of the satellite of a fixed orientation relative to the satellite.

9. The method as claimed in claim 6, wherein at least one of times and durations of said at least two orbit control maneuvers of the maneuver plan are determined to control an eccentricity of the orbit of the satellite during the maneuver plan.

10. The method as claimed in claim 1, wherein the transporter comprises an attitude control device of the satellite and an articulated arm carrying said at least one thruster of the propulsion system, the articulated arm comprises at least two articulations, each articulation having at least one degree of freedom in rotation, wherein commanding the transporter to apply the thrust forces of said at least two orbit control maneuvers of the maneuver plan comprises: commanding the articulations of the articulated arm and modifying the attitude of the satellite by the attitude control device.

11. The method as claimed in claim 1, further comprising:
determining, by a ground station and as a function of the inclination orbit control requirement and of the longitude orbit control requirement, an intermediate maneuver plan configured to control the inclination and the longitude of the orbit of the satellite without controlling the angular momentum stored in the angular momentum storage device;
transmitting, by the ground station, the intermediate maneuver plan to the satellite; and
wherein the maneuver plan is determined by the satellite as a function of the intermediate maneuver plan received and of the angular momentum unload requirement.

12. The method as claimed in claim 1, wherein the maneuver plan comprises at most two orbit control maneuvers per orbital period of the satellite.

13. A non-transitory computer readable medium comprising a set of executable program code, the code programs a processor to be configured to execute the method as claimed in claim 1 for controlling the orbit of the satellite.

14. A satellite to be placed at a station in an Earth orbit, comprising:
a propulsion system comprising at least one thruster and at least one transporter to move the propulsion system in a satellite frame of reference centered on a center of mass of the satellite, the satellite frame of reference includes three axes X, Y and Z such that in the satellite on the station in the Earth orbit, the axis X is parallel to a speed vector of the satellite, the axis Z is directed toward the Earth, and the axis Y is orthogonal to the axes X and Z;

wherein said at least one transporter is configured to:
modify angles between a thrust direction of said at least one thruster and the axes X, Y of the satellite frame of reference, respectively;
move said at least one thruster while maintaining a constant thrust direction in the satellite frame of reference to produce a torque about any axis in a plane orthogonal to said thrust direction;

a controller comprising a set of executable program code, the code programmed to control simultaneously an inclination of the orbit of the satellite, a longitude of the orbit of the satellite and an angular momentum stored in an angular momentum storage device by commanding the propulsion system and said at least one transporter according to a maneuver plan comprising at least two orbit control maneuvers;

thrust forces of the propulsion system during said at least two orbit control maneuvers have respective thrust directions that are not parallel in an inertial frame of reference; and wherein the thrust forces of said at least two orbit control maneuvers are determined to control simultaneously the inclination and the longitude of the orbit of the satellite while producing torques configured to unload the angular momentum storage device of the satellite in respective planes that are not parallel in the inertial frame of reference, so that said at least two orbit control maneuvers of the maneuver plan unloads the angular momentum storage device about the three axes.

15. The satellite as claimed in claim 14, wherein said at least one transporter comprises at least two articulated arms arranged on respective opposite sides of the plane XZ formed by the axes X and Z of the satellite frame of reference and non-symmetrically with respect to the plane XZ.

16. The satellite as claimed in claim 14, wherein said at least one transporter comprises an articulated arm carrying said at least one thruster of the propulsion system, the articulated arm comprises at least three articulations, each articulation having at least one degree of freedom in rotation about a rotation axis, respective rotation axes of adjacent articulations are not parallel to one another for at least two pairs of adjacent articulations.

17. The satellite as claimed in claim 16, wherein the articulated arm comprises an additional articulation having at least one degree of freedom in rotation about its rotation axis.

18. The satellite as claimed in claim 14, wherein the satellite comprises an additional thruster of a fixed orientation relative to the satellite.

19. The satellite as claimed in claim 14, wherein the propulsion system carried by the transporter is an electrical propulsion system.

20. The satellite as claimed in claim 14, wherein the thrust forces of said at least two orbit control maneuvers are not aligned in the satellite frame of reference and times of said at least two orbit control maneuvers have a temporal spacing different from half of an orbital period of the satellite.

21. An orbit control system for a satellite as claimed in claim 14, further comprising a processor configured to:

determine an inclination control requirement for the orbit of the satellite;
determine a longitude control requirement for the orbit of the satellite;
determine an angular momentum unload requirement for the angular momentum storage device of the satellite;
determine the thrust forces of said at least two orbit control maneuvers of the maneuver plan as a function of the inclination control requirement, of the longitude control requirement and of the angular momentum unload requirement, and
control, with the determined thrust forces, simultaneously the inclination and the longitude of the orbit of the satellite while producing torques configured to unload the angular momentum storage device of the satellite in respective planes that are not parallel in the inertial frame of reference, so that said at least two orbit control maneuvers of the maneuver plan unloads the angular momentum storage device about the three axes.

22. The satellite orbit control system as claimed in claim 21, wherein the maneuver plan verifies a following condition:

$$|EN1+EN2+RN\cdot\sin(\Delta T)|>\Gamma$$

in which expression:
$\Gamma$ is a strictly positive scalar value,
EN1 corresponds to a ratio between a component along the axis X and a component along the axis Y of a thrust force of a first orbit control maneuver of the maneuver plan,
EN2 corresponds to a ratio between a component along the axis X and a component along the axis Y of a thrust force of a second orbit control maneuver of the maneuver plan,
RN corresponds to a ratio between a component along the axis Z and the component along the axis Y of the thrust force of the first or second orbit control maneuver of the maneuver plan, and
$\Delta T$ is equal to $2\pi\cdot(T2-T1-Torb/2)/Torb$, in which expression T1 and T2 are times of the first and second orbit control maneuvers and Torb is an orbital period of the satellite.

23. The satellite orbit control system as claimed in claim 21, wherein the maneuver plan verifies a following condition:

$$\|F1\otimes F2\|>\wedge$$

in which expression:
$\wedge$ is a strictly positive scalar value, and
$\|F1\otimes F2\|$ corresponds to a norm of a cross product between the thrust forces F1 and F2 of two orbit control maneuvers of the maneuver plan.

24. The satellite orbit control system as claimed in claim 21, wherein the processor for determining the maneuver plan comprises a processor of the satellite and a processor of a ground station.

25. The satellite orbit control system as claimed in claim 24, wherein an intermediate maneuver plan configured to control only the orbit of the satellite is determined by the processor of the ground station and transmitted to the satellite, and the maneuver plan to unload the angular momentum from the angular momentum storage device is determined by the processor of the satellite as a function of the intermediate maneuver plan and of the angular momentum unload requirement.

* * * * *